United States Patent
Leah et al.

(10) Patent No.: US 7,429,987 B2
(45) Date of Patent: Sep. 30, 2008

(54) INTELLIGENT POSITIONING OF ITEMS IN A TREE MAP VISUALIZATION

(75) Inventors: Robert Leah, Cary, NC (US); Kenneth Parzygnat, Raleigh, NC (US); Robert Uthe, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/664,556

(22) Filed: Sep. 19, 2003

(65) Prior Publication Data

US 2005/0066289 A1    Mar. 24, 2005

(51) Int. Cl.
 *G06T 11/20* (2006.01)
(52) U.S. Cl. .................. 345/440; 345/441; 345/621
(58) Field of Classification Search ......... 345/440–441, 345/621
See application file for complete search history.

(56) References Cited

U.S. PATENT DOCUMENTS

| | | | |
|---|---|---|---|
| 5,515,487 A | 5/1996 | Beaudet et al. | 395/140 |
| 5,570,460 A | 10/1996 | Ramanujam | 395/124 |
| 5,577,188 A | 11/1996 | Zhu | 395/326 |
| 5,581,797 A | 12/1996 | Baker et al. | |
| 5,786,820 A | 7/1998 | Robertson | 345/357 |
| 5,917,492 A | 6/1999 | Bereiter et al. | 345/357 |
| 5,950,168 A | 9/1999 | Simborg et al. | 705/3 |
| 6,055,515 A | 4/2000 | Consentino et al. | 705/27 |
| 6,101,279 A | 8/2000 | Nguyen et al. | 382/240 |
| 6,104,400 A | 8/2000 | Halachmi et al. | 345/356 |
| 6,151,024 A | 11/2000 | Alimpich et al. | 345/357 |
| 6,151,595 A | 11/2000 | Pirolli et al. | 707/1 |
| 6,211,880 B1 | 4/2001 | Impink, Jr. | 345/418 |
| 6,216,134 B1 | 4/2001 | Heckerman et al. | 707/104 |
| 6,278,464 B1 | 8/2001 | Kohavi et al. | 345/440 |
| 6,281,896 B1 | 8/2001 | Alimpich et al. | 345/340 |
| 6,297,824 B1 | 10/2001 | Hearst et al. | 345/357 |
| 6,301,579 B1 | 10/2001 | Becker | 707/102 |
| 6,307,573 B1 | 10/2001 | Barros | 345/764 |
| 6,314,424 B1 | 11/2001 | Kaczmarski et al. | 707/10 |
| 6,341,280 B1 | 1/2002 | Glass et al. | 707/3 |
| 6,348,935 B1 | 2/2002 | Malacinski et al. | 345/853 |
| 6,373,484 B1 | 4/2002 | Orell et al. | 345/420 |

(Continued)

FOREIGN PATENT DOCUMENTS

WO    WO 01/08053 A2    2/2001

OTHER PUBLICATIONS

Screen Capture of activequote.fidelity.com/rtrnews/market_map.phtml, copyright 1999-2005, FMR Corp.

(Continued)

*Primary Examiner*—Kimbinh T Nguyen
(74) *Attorney, Agent, or Firm*—Stevens & Showalter LLP

(57) ABSTRACT

Displaying data from a data set in a tree map visualization is provided by prioritizing the data in the data set so as to associate a priority with respective elements of the data in the data set. A tree map visualization is generated based on the data set where a location of bounding boxes in the tree map is based on the priority associated with the corresponding element. Tree maps having locations of bounding boxes that are based on a priority associated with the bounding boxes are also provided.

9 Claims, 5 Drawing Sheets

U.S. PATENT DOCUMENTS

| | | | |
|---|---|---|---|
| 6,380,937 B1 | 4/2002 | Dong et al. | 345/440 |
| 6,380,957 B1 | 4/2002 | Banning | 345/828 |
| 6,448,985 B1 | 9/2002 | McNally | 345/784 |
| 6,466,918 B1 | 10/2002 | Spiegel et al. | 705/27 |
| 6,470,383 B1 | 10/2002 | Leshem et al. | 709/223 |
| 6,489,968 B1 | 12/2002 | Ortega et al. | 345/713 |
| 6,583,794 B1 | 6/2003 | Wattenberg | |
| 2002/0091684 A1* | 7/2002 | Nomiyama et al. | 707/3 |
| 2003/0085931 A1* | 5/2003 | Card et al. | 345/853 |
| 2003/0158846 A1* | 8/2003 | Ikehata et al. | 707/7 |
| 2003/0200347 A1 | 10/2003 | Weitzman | 709/310 |
| 2004/0070627 A1* | 4/2004 | Shahine et al. | 345/794 |
| 2004/0088678 A1 | 5/2004 | Litoiu et al. | 717/104 |
| 2004/0168115 A1 | 8/2004 | Bauernschmidt et al. | |
| 2004/0212615 A1 | 10/2004 | Uthe | 345/440 |
| 2004/0212616 A1 | 10/2004 | Uthe | 345/440 |
| 2004/0263513 A1 | 12/2004 | Smith et al. | |

OTHER PUBLICATIONS

Schneiderman, Ben, "Tree Visualization with Tree-Maps: 2-d Space Filling Approach," *ACM Trans. Graphics*, vol. 11, No. 1, Jan. 1992, pp. 92-99.

Johnson, Brian et al. "Tree-Maps: A Space-Filling Approach to the Visualization of Hiearchical Information Structures," Proceedings: 1991 IEEE Conference on Visualization, Oct. 22-25, 1991, pp. 284-291.

U.S. Patent Application for *Methods, Systems and Computer Program Products for Use of Color Saturation to Highlight Items In a Tree Map Visual Intelligent Positioning of Items in a Tree Map Visualization*, filed Sep. 19, 2003, U.S. Appl. No. 10/665,749, filed Sep. 19, 2003.

U.S. Patent Application for *Methods, Systems and Compute Program Products for Filtering Content Displayed in a Tree Map Visualization*, filed Sep. 19, 2003, U.S. Appl. No. 10/666,704, filed Sep. 19, 2003.

Research Disclosure "*Tree Navigator—a concept for navigation in big trees*", Aug. 2001, pp. 1384-1385.

Dachselt et al.: *Collapsible Cylindrical Trees: A Fast Hierarchical Navigation Technique*, In the Proceedings of the IEEE Symposium on Information Visualization 2001, 8 pages.

Johnson et al.: *Tree-Maps: A Space-Filling Approach to the Visualization of Hierarchal Information Structures*, Power Point Presentation, Feb. 14, 2001, 18 pages.

Ben Shneiderman, Treemaps for space-constrained visualization of hierarchies; http://www.cs.umd.edu/hcil/treemap-history/index.shtml, (1998-2006).

* cited by examiner

INTELLIGENT POSITIONING OF ITEMS IN A TREE MAP VISUALIZATION

FIELD OF THE INVENTION

The present invention relates generally to displaying data on a display device. More particularly, the present invention relates to controlling the display of data that is displayed on "tree map" visualizations.

BACKGROUND OF THE INVENTION

As computer technology advances, computing systems have undertaken the management and processing of larger data systems. With data systems ranging from massive standalone databases to vast distributed networks, oftentimes the limiting factor in analyzing the state of a given system rests not with computing resources, but with the human operator. Specifically, though the computing system may aggregate vast quantities of data in near real-time, in many cases, a human being must visualize the compilation of data to draw effective conclusions from the visualization. Yet, the ability of the end user to digest compiled information varies inversely with the amount of data presented to the end user. Where the amount of compiled data becomes excessive, it can be nearly impossible for a human being to adequately analyze the data.

In an effort to address the foregoing difficulties, tree-map visualization methods have been developed. Initially proposed by Brian Johnson and Ben Shneiderman in the paper, Johnson et al., Tree-Maps: A Space-Filling Approach to the Visualization of Hierarchical Information Structures, Dept. of Computer Science & Human-Interaction Laboratory (University of Maryland June 1991), tree-map visualization techniques map "hierarchical information to a rectangular 2-D display in a space-filling manner" in which the entirety of a designated display space is utilized. Additionally, "[i]nteractive control allows users to specify the presentation of both structural (depth bounds, etc.) and content (display properties such as color mappings) information." Tree-map visualization techniques can be compared in a contrasting manner to traditional static methods of displaying hierarchically structured information.

According to conventional static methods, a substantial portion of hierarchical information can be hidden from user view to accommodate the view of the hierarchy itself. Alternatively, the entire hierarchy can be visually represented, albeit vast amounts of display space can be obscured, hence wasted, simply to accommodate the structure without regard to the hierarchical data in the hierarchy itself. In the tree-map visualization technique, however, sections of the hierarchy containing more important information can be allocated more display space while portions of the hierarchy which are deemed less important to the specific task at hand can be allocated less space. More particularly, in operation, tree-maps partition the display space into a collection of rectangular bounding boxes representing the tree structure. The drawing of nodes within the bounding boxes can be entirely dependent on the content of the nodes, and can be interactively controlled. Since the display space size is user controlled, the drawing size of each node varies inversely with the size of the tree, for instance the number of nodes. Thus, trees having many nodes can be displayed and manipulated in a fixed display space, yet still be visible even when dealing with 1 million objects.

FIG. 1 illustrates a conventional tree map display 10. As seen in FIG. 1, a 10 by 10 display grid is filled with bounding boxes 12 through 68 representing the display of a data set containing twenty-nine entries. Data values associated with the twenty-nine entries establish the size of the bounding boxes and the color of the box, as represented by the different cross-hatch patterns illustrated in FIG. 1. Thus, a first data value may establish the size of the bounding box, for example, market capitalization if the data set represents different stocks, and a second data value may establish the color of the bounding box, for example, the change in stock price. Thus, in the example illustrated in FIG. 1, the tree map display 10 is created from the data set of Table 1 below.

TABLE 1

Exemplary Data

| Bounding Box | First Data Value | Second Data Value |
|---|---|---|
| 12 | 20 | 1 (no cross-hatch) |
| 14 | 12 | 4 (diagonal left-right) |
| 16 | 8 | 4 (diagonal left-right) |
| 18 | 8 | 1 (no cross-hatch) |
| 20 | 8 | 4 (diagonal left-right) |
| 22 | 6 | 1 (no cross-hatch) |
| 24 | 6 | 3 (diagonal right-left) |
| 26 | 4 | 3 (diagonal right-left) |
| 28 | 4 | 3 (diagonal right-left) |
| 30 | 4 | 2 (vertical cross-hatch) |
| 32 | 2 | 1 (no cross-hatch) |
| 34 | 1 | 4 (diagonal left-right) |
| 36 | 1 | 1 (no cross-hatch) |
| 38 | 1 | 1 (no cross-hatch) |
| 40 | 1 | 3 (diagonal right-left) |
| 42 | 1 | 1 (no cross-hatch) |
| 44 | 1 | 4 (diagonal left-right) |
| 46 | 1 | 2 (vertical cross-hatch) |
| 48 | 1 | 1 (no cross-hatch) |
| 50 | 1 | 4 (diagonal left-right) |
| 52 | 1 | 2 (vertical cross-hatch) |
| 54 | 1 | 3 (diagonal right-left) |
| 56 | 1 | 1 (no cross-hatch) |
| 58 | 1 | 1 (no cross-hatch) |
| 60 | 1 | 4 (diagonal left-right) |
| 62 | 1 | 3 (diagonal right-left) |
| 64 | 1 | 3 (diagonal right-left) |
| 66 | 1 | 1 (no cross-hatch) |
| 68 | 1 | 2 (vertical cross-hatch) |

A further example of the use of a tree map visualization is provided by Fidelity Investments' map of the stock market (which may be found at activequote.fidelity.com/rtrnews/market_map.phtml). In the Fidelity market map, the market is divided into sectors and the sectors are populated with bounding boxes for individual stocks. The size of the bounding boxes is based on the market capitalization of the stock and the color of the boxes are based on the price activity of the stock.

SUMMARY OF THE INVENTION

Embodiments of the present invention provide for displaying data from a data set as a tree map visualization. The data in the data set is prioritized so as to associate a priority with respective elements of the data in the data set. A tree map visualization is generated based on the data set where a location of bounding boxes in the tree map is based on the priority associated with the corresponding element.

In further embodiments of the present invention, the tree map visualization is generated so as to display the bounding boxes in a priority based pattern in the tree map. Furthermore, the priority based pattern may be a pattern with either ascending or descending priority diagonally from top to bottom of the tree map visualization.

In still further embodiments of the present invention, the priority associated with a respective element is based on a data value of the data element utilized in generating the tree map. The priority associated with a respective element could also be based on a data value of the data element that is not utilized in generating the tree map. The priority associated with a respective element could be based on metadata associated with the data element.

In particular embodiments of the present invention, prioritizing the data in the data set includes assigning a unique priority value to each element in the data set. The priority associated with a respective element may be dynamically determined. The priority associated with a respective element could also be statically defined.

In additional embodiments of the present invention, the tree map visualization is generated so as to display the bounding boxes based on priority irrespective of whether the locations of the bounding boxes result in complete utilization of available display area for the tree map visualization.

In other embodiments of the present invention, a tree map visualization displayed on a display device is provided that includes a plurality of bounding boxes, wherein a location of respective ones of the bounding boxes in the tree map visualization is based on corresponding priorities associated with the respective ones of the bounding boxes. A size of a bounding box in the plurality of bounding boxes may be based on a first data value associated with the bounding box. A color and/or shade of the bounding box may be based on a second data value associated with the bounding box. The priority corresponding to the bounding box may be a third data value associated with the bounding box. Additionally, the plurality of bounding boxes may be arranged in either ascending or descending priority from top to bottom of the tree map visualization.

In further embodiments of the present invention, the tree map visualization includes at least one void region that does not contain a bounding box.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
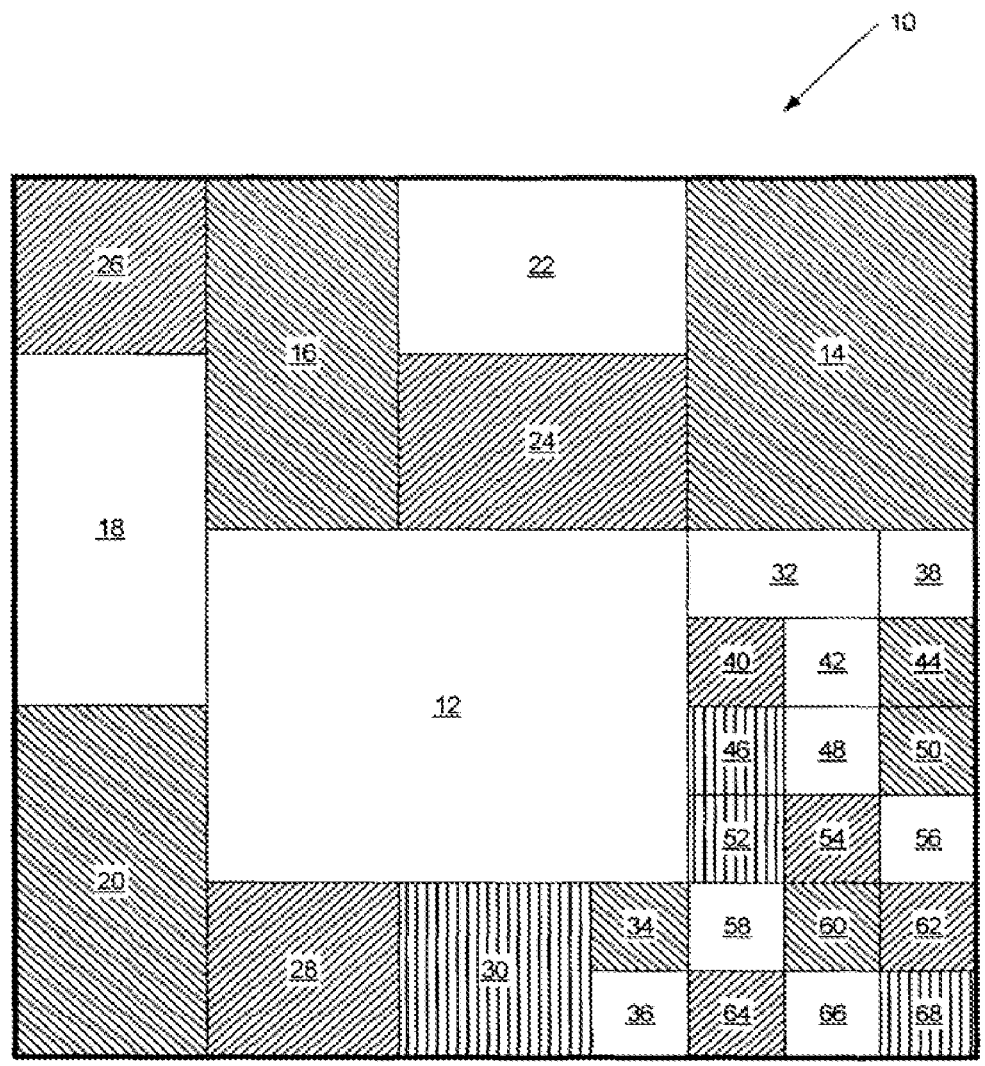
FIG. 1 is an illustration of the display of a set of data utilizing a conventional tree map.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for displaying data in tree map format on an electronic display by prioritizing the data to be displayed and displaying the bounding boxes associated with the data in an order reflecting the prioritization. Such prioritized display of bounding boxes may provide a mechanism so as to add additional information to the display of the data so as to allow a user to more readily assess the information displayed. The priority criteria may be based on the data itself, associated data, a characteristic of the data itself and/or may be provided as metadata.

Figure 2:
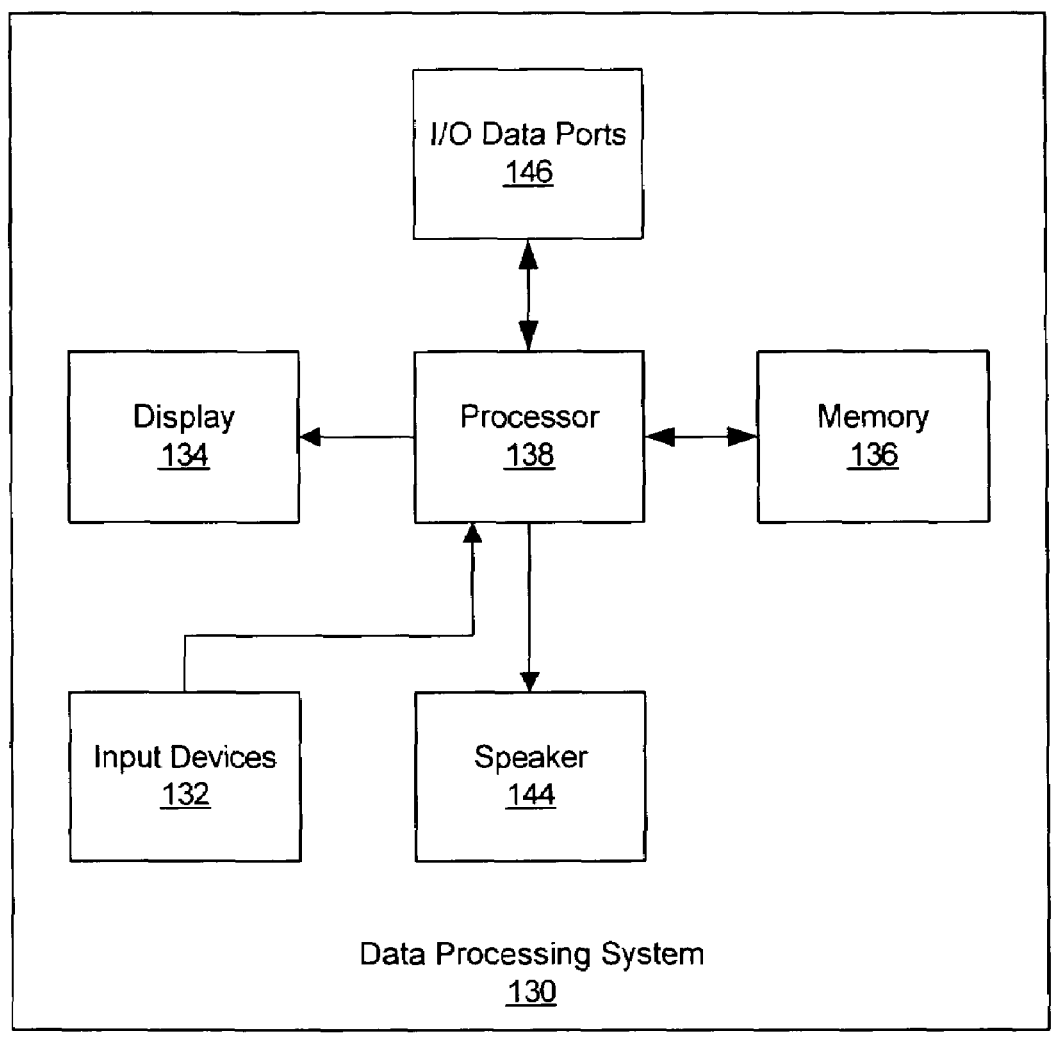
FIG. 2 is a block diagram of a data processing system suitable for use in embodiments of the present invention.

Various embodiments of the present invention will now be described with reference to the figures. FIG. 2 illustrates an exemplary embodiment of a data processing system 130 suitable for a server and network traffic associated with the replicated server in accordance with embodiments of the present invention. The data processing system 130 typically includes input device(s) 132 such as a keyboard, pointer, mouse and/or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 3:
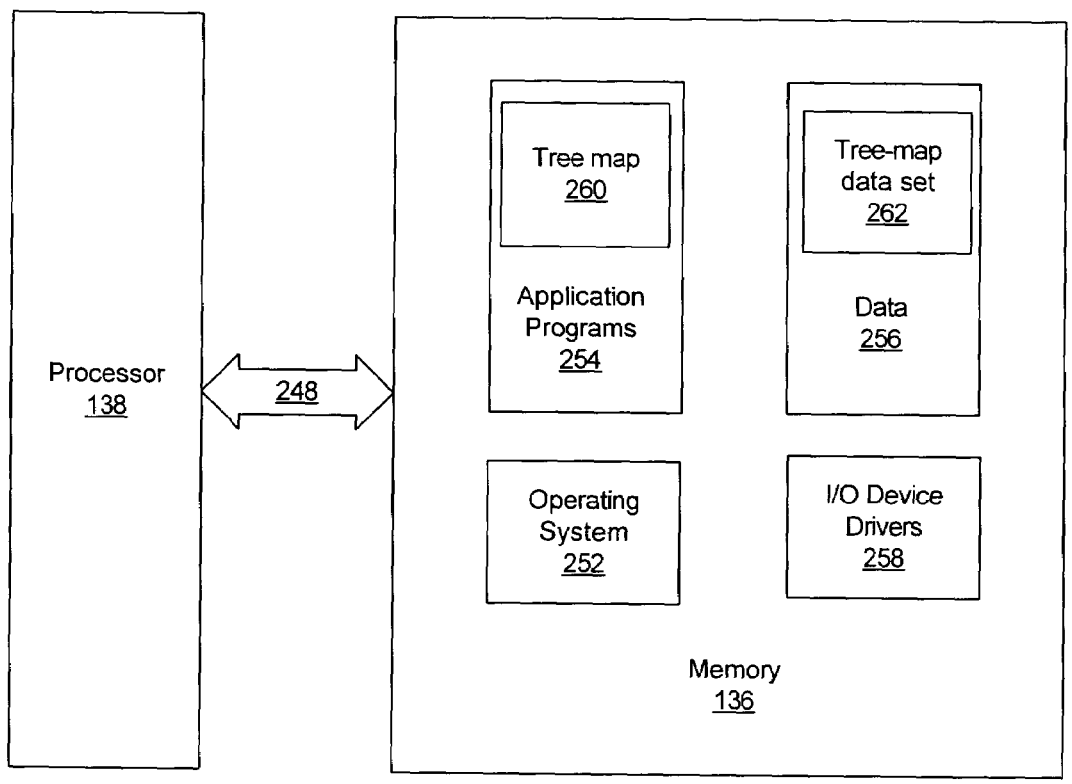
FIG. 3 is a more detailed block diagram of aspects of a data processing system that may be used in embodiments of the present invention.

FIG. 3 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices, and may contain the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 3, the memory 136 may include several categories of software and data used in the data processing system 130: the operating system 252; the application programs 254; the input/output (I/O) device drivers 258; and the data 256, which may include hierarchical data sets. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 3, the application programs 254 may include a tree map module 260. The tree map module 260 may carry out the operations described herein for displaying a tree map diagram of a data set, such as the tree map data 262. While the present invention is illustrated, for example, with reference to the tree map module 260 being an application program in FIG. 3, as will be appreciated by those of skill in the art, other configurations may also be utilized. For example, the tree map module 260 may also be incorporated into the operating system 252, the I/O device drivers 258 or other such logical division of the data processing system 130. Thus, the present invention should not be construed as limited to the configuration of FIG. 3 but encompasses any configuration capable of carrying out the operations described herein.

One difficulty with tree map visualizations is that the tree map is created so as to utilize all of the available display area. As such, the location of bounding boxes in the tree map is typically established without reference to the nature of the underlying data. The bounding boxes are typically arranged to utilize all of the available display area. Accordingly, the location of items of interest to a user may change from map to map and related and/or important items may be spread out in the map depending on the distribution of bounding boxes that utilizes all of the available display area.

Embodiments of the present invention provide prioritized display of the data for a tree map visualization so as to display data in the tree map in a predefined pattern that reflects the priority of the item displayed. For example, the data set of Table 1 may be prioritized for display. The determination of priority may be based on the data itself, for example, increasing or decreasing data value, may be determined based on data associated with the data for display, may be based on a characterization and/or classification of the nature of the data being displayed and/or may be specified as a separate priority value. As used herein, the term priority refers to a sequence for display of data and does not necessarily refer to a judgment as to the importance of the data.

The predefined pattern for display based on priority may be any suitable pattern of display. For example, higher priority data may be displayed in an upper left hand corner of the tree map and lower priority data may be displayed in a lower right hand corner of the tree map. Thus, priority may decrease diagonally across the map from left to right and top to bottom. Alternatively, priority could increase or decrease diagonally and from top to bottom. Priority could also increase or decrease on a line by line basis with boxes closer to the left or right sides of a line having a higher priority. Furthermore, the particular pattern may take into account the way in which the data is prioritized so as to provide for a high utilization of the display area. These patterns of display based on a priority are provided as examples. Embodiments of the present invention should not be construed as limited to a particular pattern but is intended to encompass any pattern of display based on priority.

Returning to the example of Table 1, Table 2 below reflects a prioritization of the data from Table 1. The prioritization illustrated in Table 2 is arbitrary, however, as discussed herein, prioritization may be analytically determined and/or user defined. The display of the prioritized tree map data according to certain embodiments of the present invention results in the tree map of FIG. 4.

TABLE 2

Exemplary prioritized data set

| Bounding Box | First Data Value | Second Data Value | Priority |
|---|---|---|---|
| 412 | 20 | 1 (no cross-hatch) | 1 |
| 414 | 12 | 4 (diagonal left-right) | 4 |
| 416 | 8 | 4 (diagonal left-right) | 5 |
| 418 | 8 | 1 (no cross-hatch) | 6 |
| 420 | 8 | 4 (diagonal left- | 7 |

TABLE 2-continued

Exemplary prioritized data set

| Bounding Box | First Data Value | Second Data Value | Priority |
|---|---|---|---|
| 422 | 6 | 1 (no cross-hatch) | 8 |
| 424 | 6 | 3 (diagonal right-left) | 9 |
| 426 | 4 | 3 (diagonal right-left) | 10 |
| 428 | 4 | 3 (diagonal right-left) | 2 |
| 430 | 4 | 2 (vertical cross-hatch) | 11 |
| 432 | 2 | 1 (no cross-hatch) | 12 |
| 434 | 1 | 4 (diagonal left-right) | 13 |
| 436 | 1 | 1 (no cross-hatch) | 14 |
| 438 | 1 | 1 (no cross-hatch) | 15 |
| 440 | 1 | 3 (diagonal right-left) | 16 |
| 442 | 1 | 1 (no cross-hatch) | 17 |
| 444 | 1 | 4 (diagonal left-right) | 3 |
| 446 | 1 | 2 (vertical cross-hatch) | 18 |
| 448 | 1 | 1 (no cross-hatch) | 19 |
| 450 | 1 | 4 (diagonal left-right) | 20 |
| 452 | 1 | 2 (vertical cross-hatch) | 21 |
| 454 | 1 | 3 (diagonal right-left) | 22 |
| 456 | 1 | 1 (no cross-hatch) | 23 |
| 458 | 1 | 1 (no cross-hatch) | 24 |
| 460 | 1 | 4 (diagonal left-right) | 25 |
| 462 | 1 | 3 (diagonal right-left) | 26 |
| 464 | 1 | 3 (diagonal right-left) | 27 |
| 466 | 1 | 1 (no cross-hatch) | 28 |
| 468 | 1 | 2 (vertical cross-hatch) | 29 |

Figure 4:
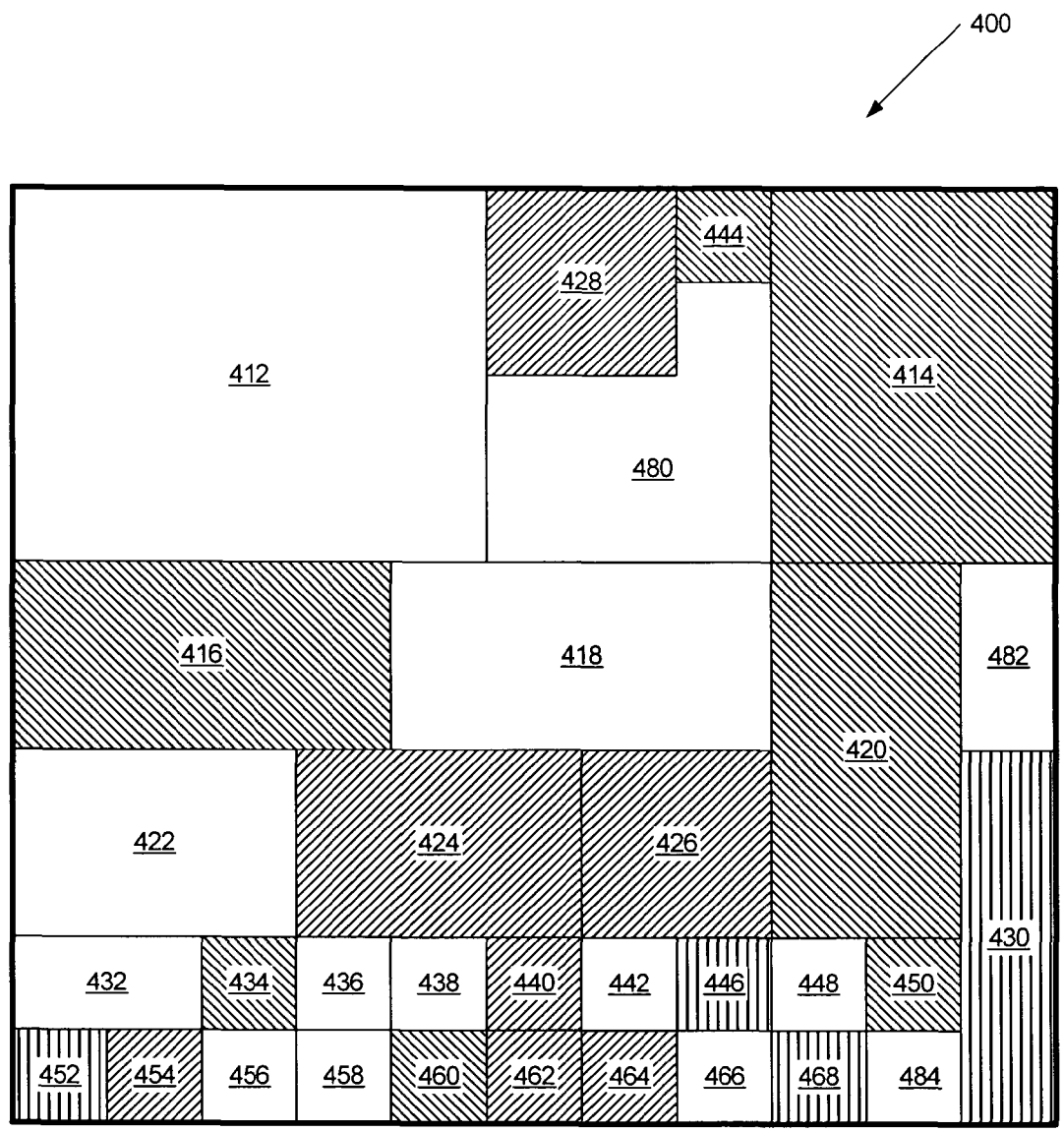
FIG. 4 is an illustration of the display of a set of data of FIG. 1 utilizing a tree map according to embodiments of the present invention.

As seen in FIG. 4, a tree map visualization is generated based on the first and second data values, the prioritization of those values and the pattern in which priority is displayed. In FIG. 4, higher priority items are placed closer to the top of the map and closer to the left side of the map.

As seen in FIG. 4, in comparison to FIG. 1 the sequence of the bounding boxes for the corresponding elements of the data set of Table 1 in the tree map 400 has changed. In FIG. 4, the reference numerals of the bounding boxes 412 to 468 correspond to those of FIG. 1 increased by 400. Thus, for example, the bounding box 412 corresponds to the bounding box 12 of FIG. 1, the bounding box 414 corresponds to the bounding box 14 of FIG. 1, etc. Because the bounding boxes are arranged in a prioritized pattern, the tree map of FIG. 4 not only displays a visualization of the first and second data values, it also displays a visualization of a third value, the priority value.

Utilizing the tree map 400 of FIG. 4, a user may quickly ascertain the priority relationship between the data represented by the tree map 400. Furthermore, because the data is arranged in a predefined priority pattern, the user may also know where to look in the tree map 400 for the information that may be most critical to monitor.

Because the bounding boxes 412 to 468 are arranged in priority order, it may not be possible to completely utilize the display area of the tree map 400. Thus, the tree map 400 has void regions 480, 482 and 484 where no information is displayed. Accordingly, embodiments of the present invention provide a modified tree map where bounding boxes of data elements are arranged in a predefined priority pattern and where all of the available display area is not necessarily utilized to display a bounding box.

Figure 5:
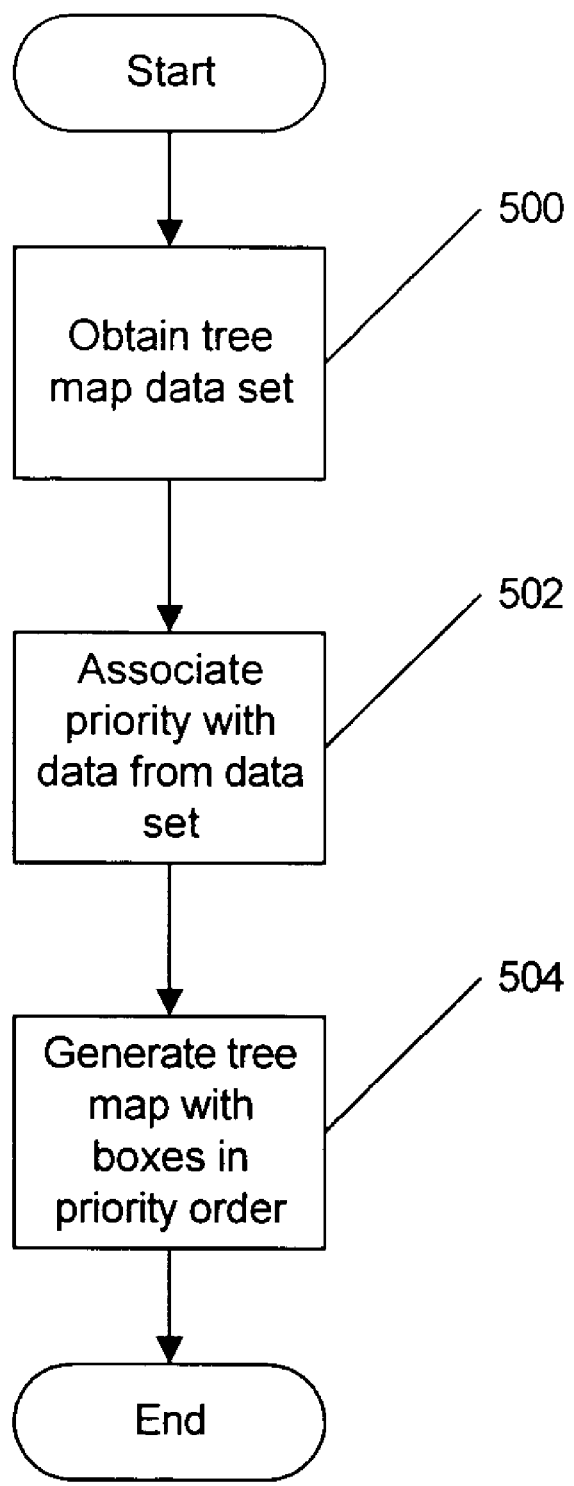
FIG. 5 is a flowchart illustrating operations according to embodiments of the present invention.

FIG. 5 is a flowchart illustration that depicts operations for prioritized display on a tree map pursuant to embodiments of the present invention. As shown in FIG. 5, a data set of tree map data is obtained (block 500). The data in the tree map data set is prioritized so that a priority is associated with data elements in the data set (block 502). The tree map is then generated such that the bounding boxes of the elements of the data set are arranged in a predefined pattern based on the priority associated with the corresponding element (block 504).

The criteria for prioritizing the data from the tree map data set may be a statically defined criteria or may be a dynamically generated criteria. The data may be prioritized based on any suitable analysis of the data, for example, the data may be prioritized based on a series of threshold values. The priority criteria or priority values may be statically set, user specified and/or dynamically determined. The dynamic determination of priority may be provided based on an evaluation of the data values and/or a desired tree map characteristic. For example, the priority may be dynamically set based on an evaluation of the data set.

As mentioned above, the priority of an element of the data set may be based on the values of data that is displayed in the tree map, data associated with the data that is displayed in the tree map and/or metadata associated with the tree map data set. In the first instance, the data may be prioritized based on one or more of the data values that are used in generating the tree map. For instance, in the stock market example, the data may be prioritized based on market capitalization and/or a minimum change in stock price.

The data set could also be prioritized based on additional data associated with the data that generates the tree map. For instance, in the stock market example, the data may be prioritized based on stock market activity where the priority is based on trading activity of a stock.

The data set could also be prioritized based on metadata (i.e. data about the data) associated with the data set that generates the tree map. For example, the data set could be prioritized based on deviation from a standard or average of values of the data in the data set. Similarly, the metadata may directly indicate a priority associated with elements of the data set. For instance, in the stock market example, stocks owned by a user and/or tracked by the user could be identified and prioritized based on whether a stock was owned, tracked and/or not prioritized.

In further embodiments of the present invention, multiple priorities may be used to arrange the bounding boxes in the tree map. For example, right to left could indicate increasing value of a first priority category while bottom to top would indicate increasing priority in a second priority category. In such a case, the upper left corner would contain the bounding box with the highest priority in both categories. In such a case, a hierarchy of the priority categories may need to be defined so as to determine a location between to equally situated bounding boxes.

Embodiments of the present invention have been illustrated with reference to a unique priority being assigned to each data element of the tree map data set. However, in further embodiments of the present invention, different data elements in the tree map data set may have the same priority. In such a case, the location of display within the priority pattern of bounding boxes having the same priority may be established arbitrarily or based on another criteria, such as to maximize display utilization or a second priority criteria. However, such bounding boxes will still be displayed in priority order with respect to bounding boxes having a higher or lower priority. Accordingly, the present invention should not be construed as limited to the assignment of unique priorities.

The flowcharts and block diagrams of FIGS. 2, 3 and 5 illustrate the architecture, functionality, and operation of possible implementations of systems, methods and computer program products for selectively controlling tree map graphical user interfaces according to various embodiments of the present invention. In this regard, each block in the flow charts or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of displaying data from a data set in a tree map visualization, comprising:

prioritizing the data in the data set so as to associate a priority with respective elements of the data in the data set, where the associated priorities designate a desired sequence to the respective elements of the data set;

predefining a pattern that reflects a desired display pattern for the associated priority of the elements of the data in the data set;

generating the tree map visualization that positions within a display space, a combination of bounding boxes corresponding to the elements of the data in the data set and void regions where no information is displayed, such that each bounding box in the tree map visualization is arranged in priority order based upon the sequence designated by the priority associated with its corresponding element and the predefined pattern and the void regions fill in the remainder of the display space where no bounding box is present; and displaying the tree map visualization on a display device.

2. The method of claim 1, wherein predefining a pattern comprises defining a priority based pattern.

3. The method of claim 2, wherein defining a priority based pattern comprises defining a pattern with one of ascending or descending priority diagonally from top to bottom of the tree map visualization.

4. The method of claim 1, wherein prioritizing the data in the data set comprises defining a priority value associated with a respective element based on a data value of the data element utilized in generating the tree map visualization.

5. The method of claim 1, wherein prioritizing the data in the data set comprises defining a priority value associated with a respective element based on a data value of the data element that is not utilized in generating the tree map.

6. The method of claim 1, wherein prioritizing the data in the data set comprises defining a priority value associated with a respective element based on metadata associated with the data element.

7. The method of claim 1, wherein prioritizing the data in the data set comprises assigning a unique priority value to each element in the data set.

8. The method of claim 1, wherein prioritizing the data in the data set comprises dynamically determining a priority value for each element.

9. The method of claim 1, wherein prioritizing the data in the data set comprises statically defining a priority value for each element.

* * * * *